US012559306B2

(12) United States Patent
Nikolic et al.

(10) Patent No.: US 12,559,306 B2
(45) Date of Patent: Feb. 24, 2026

(54) DISPOSAL UNIT AND INDICATOR SYSTEM THEREFOR

(71) Applicant: Bradley Company, LLC, Menomonee Falls, WI (US)

(72) Inventors: Zeljko Nikolic, Mequon, WI (US); Mark A. Meyer, Menomonee Falls, WI (US)

(73) Assignee: Bradley Company, LLC, Menomonee Falls, WI (US)

( * ) Notice: Subject to any disclaimer, the term of this patent is extended or adjusted under 35 U.S.C. 154(b) by 0 days.

(21) Appl. No.: 18/639,604

(22) Filed: Apr. 18, 2024

(65) Prior Publication Data

US 2025/0326573 A1 Oct. 23, 2025

(51) Int. Cl.
*B65F 1/14* (2006.01)
*B65F 1/16* (2006.01)

(52) U.S. Cl.
CPC .............. *B65F 1/1484* (2013.01); *B65F 1/16* (2013.01); *B65F 2210/138* (2013.01); *B65F 2240/164* (2013.01)

(58) Field of Classification Search
CPC .... B65F 2240/164; B65F 1/1484; B65F 1/16; B65F 2210/138
See application file for complete search history.

(56) References Cited

U.S. PATENT DOCUMENTS

| | | | | |
|---|---|---|---|---|
| 6,295,946 | B1 * | 10/2001 | Kasik | B65F 1/14 116/303 |
| 8,720,686 | B1 * | 5/2014 | Shuman | B65F 1/14 220/908 |
| 10,035,647 | B1 * | 7/2018 | Rodoni | B65F 1/1484 |
| 2017/0022005 | A1 * | 1/2017 | Foster | B62B 1/12 |
| 2020/0231380 | A1 * | 7/2020 | Kinder | B65F 1/16 |
| 2021/0403232 | A1 | 12/2021 | Liistro et al. | |

FOREIGN PATENT DOCUMENTS

| | | |
|---|---|---|
| EP | 2580148 | 8/2019 |
| KR | 10-2016-0052971 | 5/2016 |
| KR | 10-2050947 | 12/2019 |

OTHER PUBLICATIONS

International Written Opinion and Search Report for PCT/US2025/024866 dated Aug. 1, 2025.

* cited by examiner

*Primary Examiner* — Javier A Pagan
(74) *Attorney, Agent, or Firm* — Boyle Fredrickson, S.C.

(57) ABSTRACT

A disposal unit includes a housing surrounding a cavity and an indication slot formed in the housing. An indicator system is mounted within the housing and includes an indicator arm movable between a start point not aligned with the indication slot and an end point aligned with the indication slot. When the indicator arm is in the start position, the indicator arm is configured to transition from the start point to the end point upon opening of a door of the housing. Conversely, when the indicator arm is in the end position, the indicator arm is configured to remain in the end point upon opening of the door of the housing.

20 Claims, 11 Drawing Sheets

DISPOSAL UNIT AND INDICATOR SYSTEM THEREFOR

BACKGROUND OF THE INVENTION

1. Field of the Invention

The present invention relates in general to the field of disposal units. More particularly, the present invention relates to disposal unit and an indicator system for the disposal unit. More Specifically, a preferred embodiment of the present invention relates to an indicator system for a disposal unit to indicate when the disposal unit has been used.

2. Discussion of the Related Art

Disposal units for waste products, such as sanitary napkins and other single use female hygiene products are well known in the art. Such disposal units can be found in female rest rooms and other areas to provide a better disposal alternative than a traditional waste basket. It is preferrable to not leave such waste products in disposal units for an extended period of time to prevent unwanted environmental effects due to prolonged exposure of the waste products.

Thus, it would be desirable to provide a disposal unit that include an indicator system for indicating to maintenance personnel when the disposal unit has been used and needs to be emptied in order to maintain an ideal environment.

SUMMARY AND OBJECTS OF THE INVENTION

The present invention is directed to a disposal unit and an indicator system for a disposal unit to indicate when the disposal unit has been used.

In accordance with an embodiment of the invention, a disposal unit includes a housing surrounding a cavity and an indication slot formed in the housing. An indicator system is mounted within the housing and includes an indicator arm movable between a start point not aligned with the indication slot and an end point aligned with the indication slot. When the indicator arm is in the start position, the indicator arm is configured to transition from the start point to the end point upon opening of a door of the housing. Conversely, when the indicator arm is in the end position, the indicator arm is configured to remain in the end point upon opening of the door of the housing.

According to another aspect of the invention, when the indicator arm is at the end point, the indicator arm may be transitioned from the end point to the start point by a user upon accessing the cavity of the housing.

According to yet another aspect of the invention, the indicator system may also include an indicator housing mounted to the door of the disposal unit. The housing body includes a main surface spaced apart from the door by a plurality of sidewalls to form an indicator cavity therebetween. The main surface of the indicator housing may include a slot formed therein. Further, the indicator arm may be pivotably mounted within the indicator cavity and have a first end and a second end. The second end of the indicator arm may be configured to travel along the slot between the start point and the end point.

According to another aspect of the invention, the slot includes a recess formed at least partially therethrough at the start point thereof. Further, the recess has a diameter larger than a diameter of the slot and. As a result, the recess is configured to receive a locator tab of the indicator arm. The locator tab may be movably coupled to the second end of the indicator arm in order to sit within the recess when the door of the disposal unit is open and space itself apart from the recess when the door of the disposal unit is closed while the indicator arm remains at the start point.

According to yet another aspect of the invention, when the indicator is at the end point, the indicator arm transitions from the end point to the start point upon pivoting a front panel of the housing to access the cavity of the housing. Meanwhile, the indicator arm may also include an extension tab extending from a side of the indicator arm. The extension tab interacts with the door of the disposal unit in order to transition the indicator arm from the start point to the end point upon opening of the door of the disposal unit.

In accordance with another embodiment of the invention, an indicator system for a disposal unit includes a housing body with a main surface and a sidewall extending from one or more edges of the main surface toward a mounting surface. The main surface is spaced apart from the mounting surface to form a cavity therebetween and has a slot opening formed therein. The indicator system also includes an indicator arm having a first end and a second end. The first end of the indicator arm is pivotably mounted to at least one of the housing body and the mounting surface, while the second end of the pivoting arm travels along the slot. The indicator system also includes a locator movably coupled to the second end of the indicator arm. The locator has a tab portion and neck portion. The neck portion is disposed within the slot opening. Further, the slot opening extends from a start point to an end point. The start point of the slot opening includes a recess with a diameter larger than a diameter of the slot opening. The recess is able to receive the tab portion of the locator.

According to another aspect of the invention, the locator is movably coupled in a direction normal to the second end of the pivoting arm. The locator may be able to transition away from the indicator arm in the direction normal upon closing of a lid of the disposal unit. Further yet, the locator is configured to transition toward the indicator arm in the direction normal by a user to secure the locator in the recess while the lid of the disposal unit is open. The indicator arm may also be configured to transition or remain in the end point of the slot upon opening of a lid of the disposal unit.

According to yet another aspect of the invention, the housing body may also include a secondary surface disposed at an end of the sidewall opposite the main surface of the housing body. The secondary surface extends perpendicular to the sidewall. Further yet, the secondary surface is coupled to the mounting surface.

In accordance with yet another embodiment of the invention, an indicator system for a disposal unit includes an indicator arm pivotably mounted to the disposal unit to transition from a start point to an end point and an indication surface of the indicator arm configured to align with an indicator slot in the disposal unit when in at the end point. Upon opening of the disposal unit by a user, the indicator arm transitions or remains in the start point. Conversely, upon pushing a door of the disposal unit, the door interacts with the indicator arm to transition or remain in the end point.

According to another aspect of the invention, the indicator arm is pivotably mounted to a front panel of the disposal unit. In addition, the disposal unit is opened by a user by pivoting the front panel of the disposal unit from a closed orientation to an open orientation.

According to yet another aspect of the invention, the indicator arm includes an extension tab extending from a side of the indicator arm at an angle relative thereto. More specifically, the extension tab extends from the indicator arm in a direction toward the door of the disposal unit so that pushing the door of the disposal unit causes the door to interact with the extension tab to transition the indicator arm to the end point. In addition, a stop element may be disposed within the disposal unit and include a stop tab to locate the indicator arm in the start point.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

Figure 1:
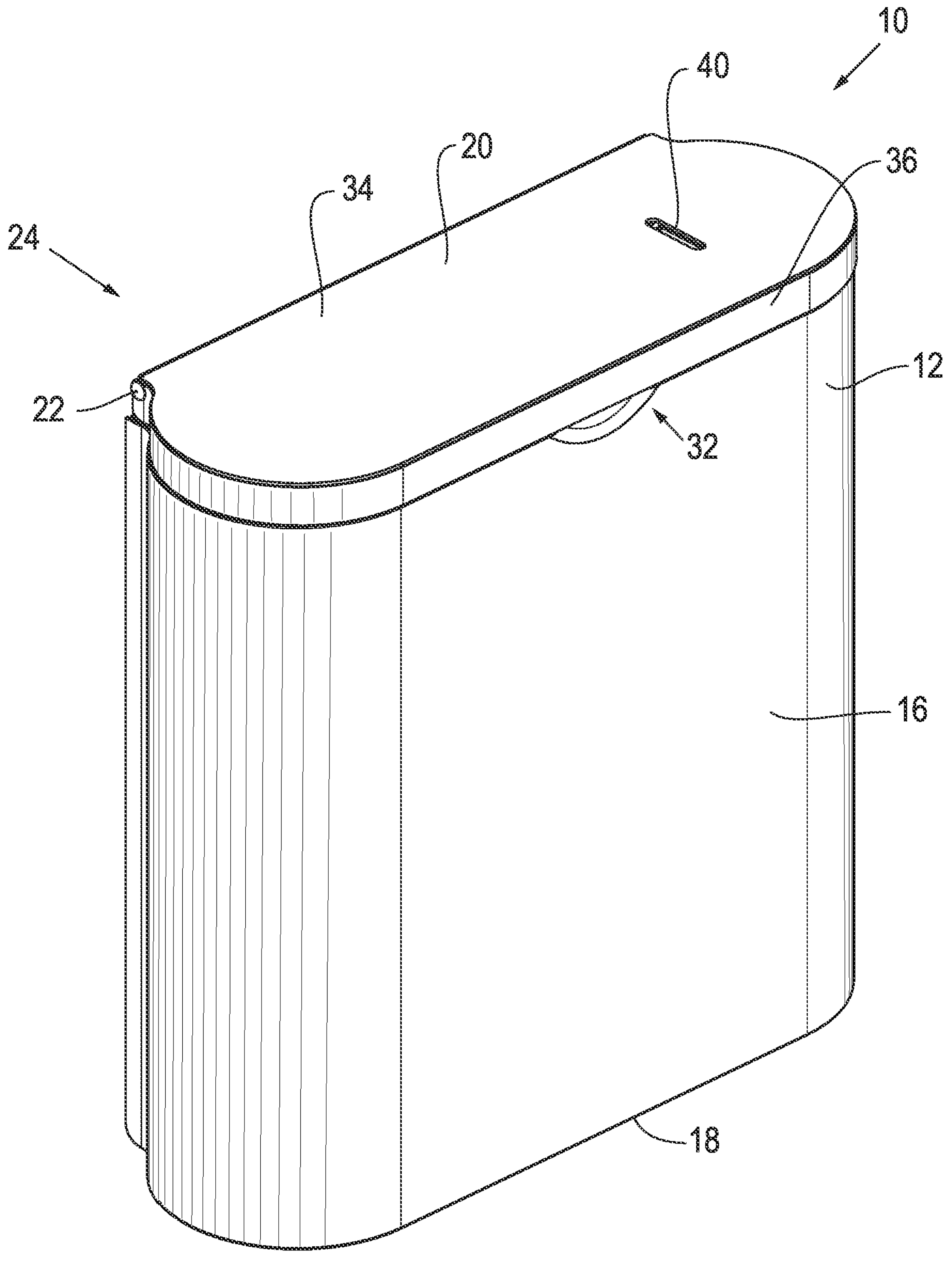
FIG. 1 is an isometric view of a disposal unit according to a first embodiment of the invention.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected, attached, or terms similar thereto are often used. They are not limited to direct connection but include connection through other elements where such connection is recognized as being equivalent by those skilled in the art.

DESCRIPTION OF PREFERRED EMBODIMENTS

The present invention and the various features and advantageous details thereof are explained more fully with reference to the non-limiting embodiments described in detail in the following description.

Throughout this description, various terms denoting direction, such as left and right, front and rear, up and down, top and bottom, and the like may be used. The directions are not intended to be limiting but are used to describe relationships of elements with respect to each other in the accompanying drawings. Unless mutually exclusive, it is contemplated that the elements may be reversed, for example, by turning a component around or upside down without deviating from the scope of the present invention.

Figure 2:
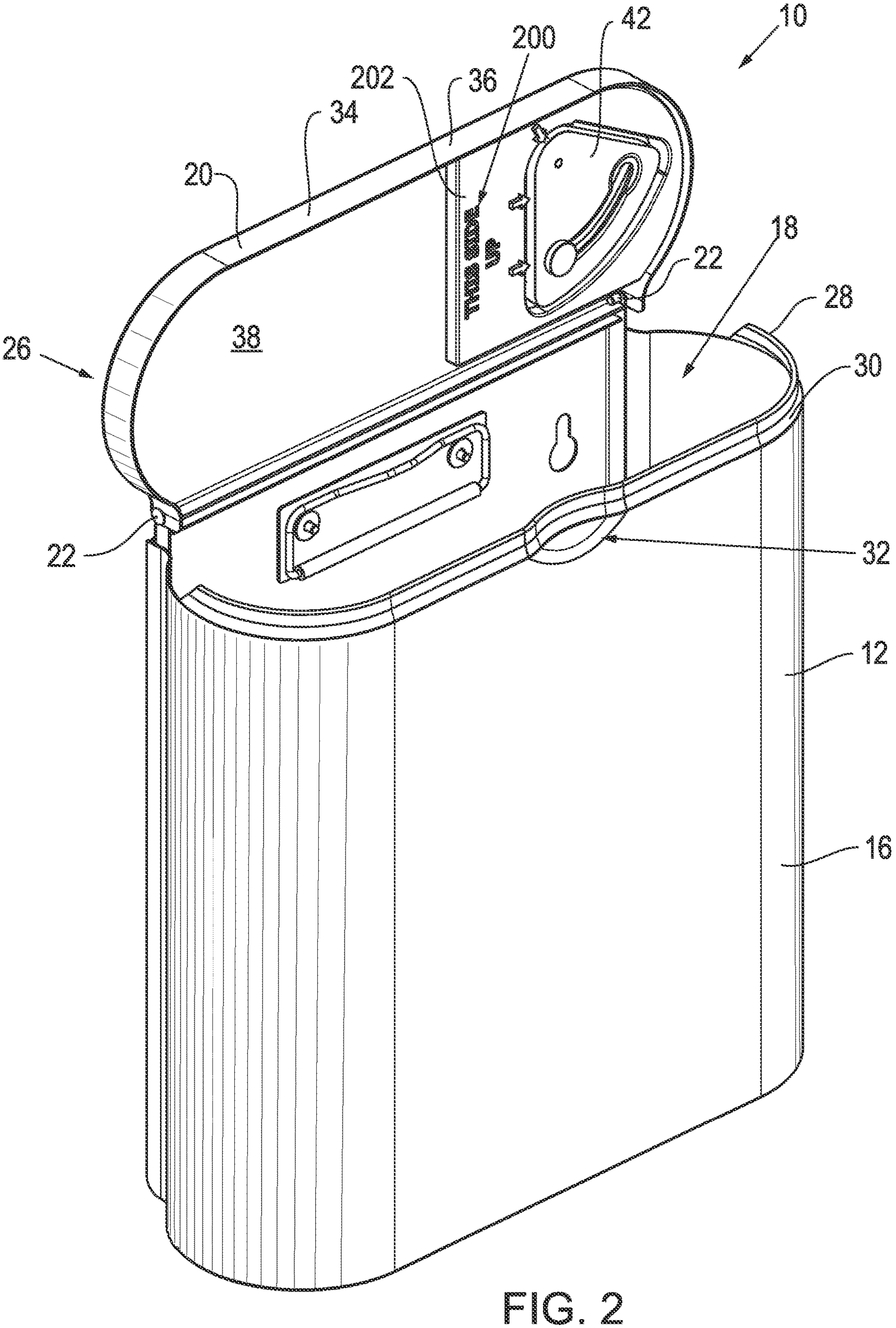
FIG. 2 is an isometric view of the disposal unit of FIG. 1 with the door/lid in an open position.
Figure 3:
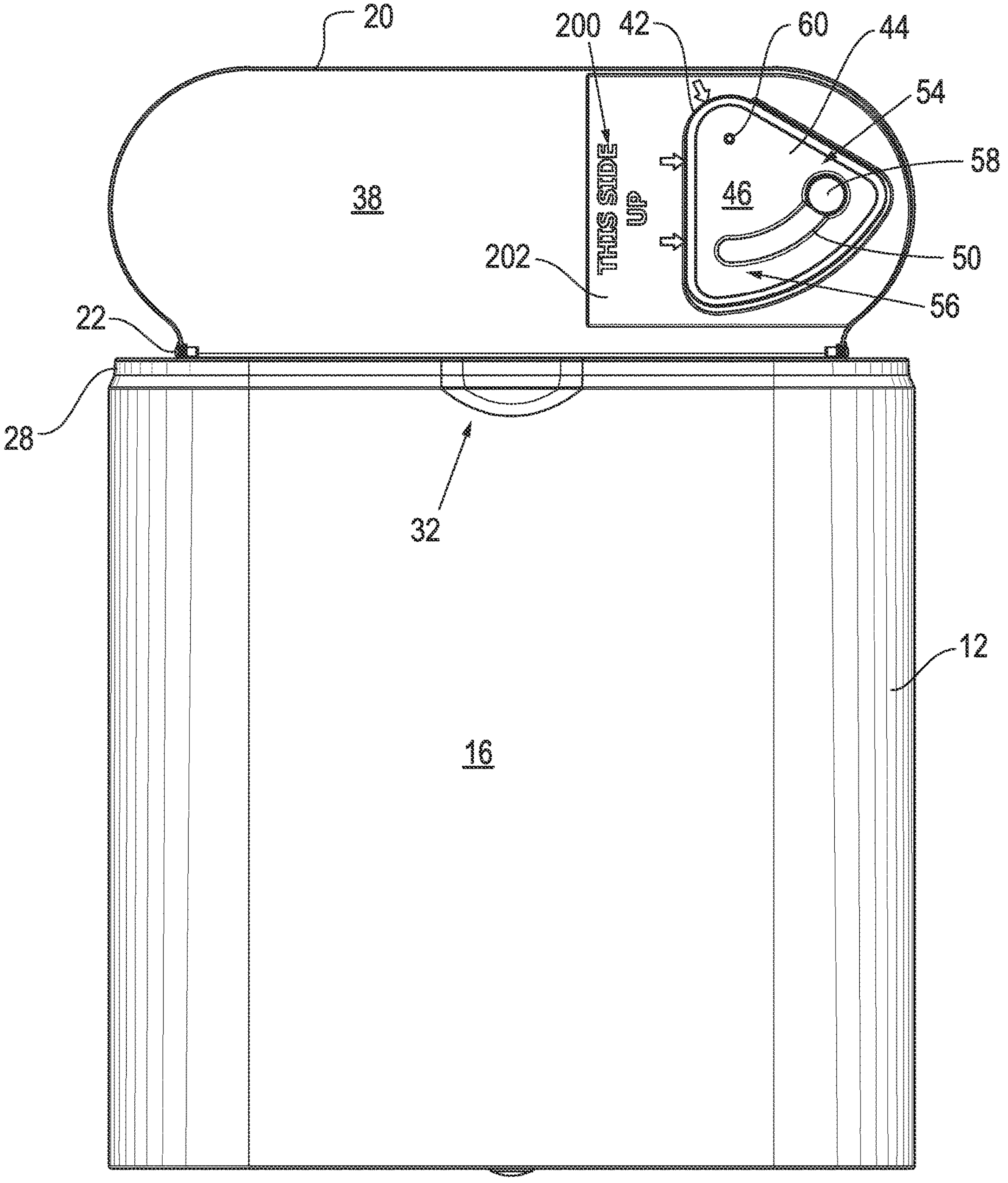
FIG. 3 is an elevation view of the door/lid of the disposal unit of FIG. 1 with an indicator system in a first orientation.
Figure 4:
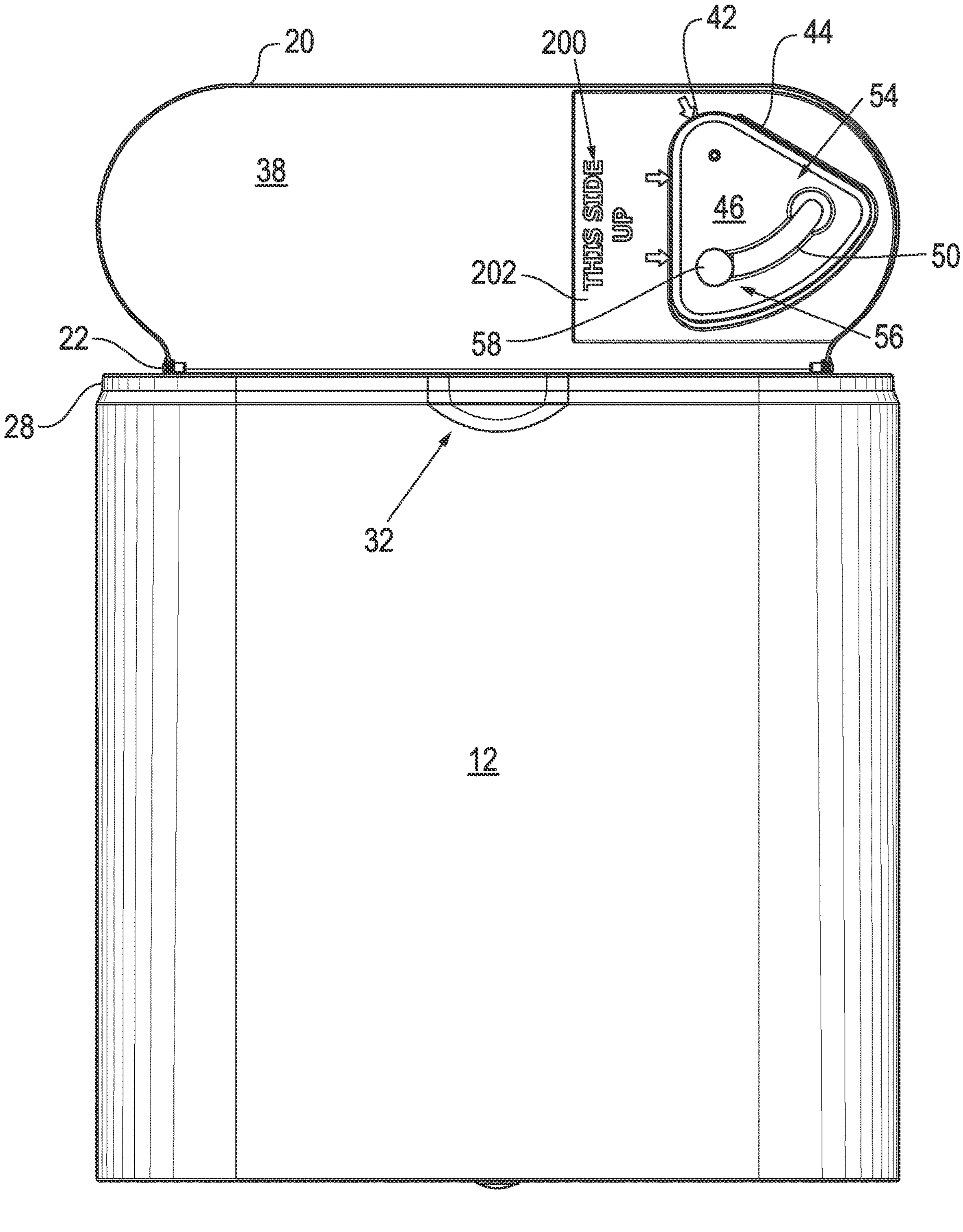
FIG. 4 is an elevation view of the door/lid of the disposal unit of FIG. 1 with the indicator system in a second orientation.
Figure 5:
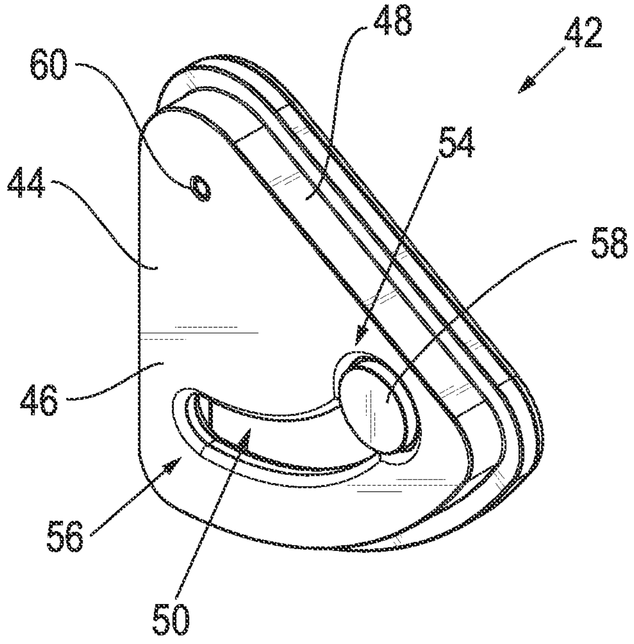
FIG. 5 is an isometric view of the indicator system of FIGS. 3 and 4 in the first orientation.

Turning initially to FIGS. 1-7, a disposal unit 10 is shown according to one embodiment of the invention. The disposal unit 10 includes a housing 12 surrounding a cavity 14 in which a user may dispose of a waste product. The disposal unit 10 may be free standing or mounted to a wall. In the representative embodiment of the invention, the housing 12 includes a single pill-shaped sidewall 16 surrounding the cavity 14 with a bottom plate 18 and a door or lid 20. However, in varying embodiments of the invention, the sidewall 16 of the housing 12 may be in the form of any number of sidewalls 16. As shown in FIGS. 1-4, the lid 20 is pivotably coupled to the housing 12 at a hinge 22. FIG. 1 illustrates the lid 20 in a closed position 24, while FIGS. 2, 3, and 4 illustrate the lid 20 in an open position 26. In the representative embodiment of the invention, the lid 20 is hinged to the sidewall 16 at a rear location of the housing 12. In other words, the axis of rotation of the lid 20 is at a rear location of the housing 12.

FIG. 2 illustrates an alignment rim 28 extending upward from at least a portion of a top edge 30 of the sidewall 16. The rim 28 is horizontally offset from the sidewall 16 in a direction toward the cavity 14. In turn, the rim 28 is received by the lid 20 when the lid 20 closes and assists in aligning the lid 20 with the sidewall 16 of the housing 12. Further, the sidewall 16 may include an indentation 32 formed at the top edge 30 of the sidewall 16 that is formed inward toward the cavity 14 and configured to receive the hand of user attempting to pivot the lid 20 and open the disposal unit 10. As shown in FIG. 2, the rim 28 of the housing 12 may also include an indentation similar to that of the indentation 32 of the sidewall 16 of the housing 12.

Now referring to the lid 20 shown in FIG. 2, the lid 20 includes top plate 34 and a sidewall 36 extending downward from the top plate 34 to align with the sidewall 16 of the housing 12 when the lid 20 is in the closed position 24. The interior side of the top plate 34 of the lid 20 is indicated as a mounting surface 38. The top plate 34 also includes an indicator slot 40 formed therethrough.

An indicator system 42 and its housing body 44 is mounted to the mounting surface 38 of the lid 20 in the embodiment shown in FIGS. 1-4. Now referring to FIGS. 5-7, the indicator system 42 is shown according to a first embodiment of the invention. The housing body 44 of the indicator system includes a main surface 46 and one or more sidewalls 48 extending perpendicular to the main surface 46 and towards the mounting surface 38 of the lid 20. As a result, the main surface 46 of the indicator system 42 is spaced apart from the mounting surface 38 of the lid 20 to form a cavity 49 therebetween.

Figure 7:
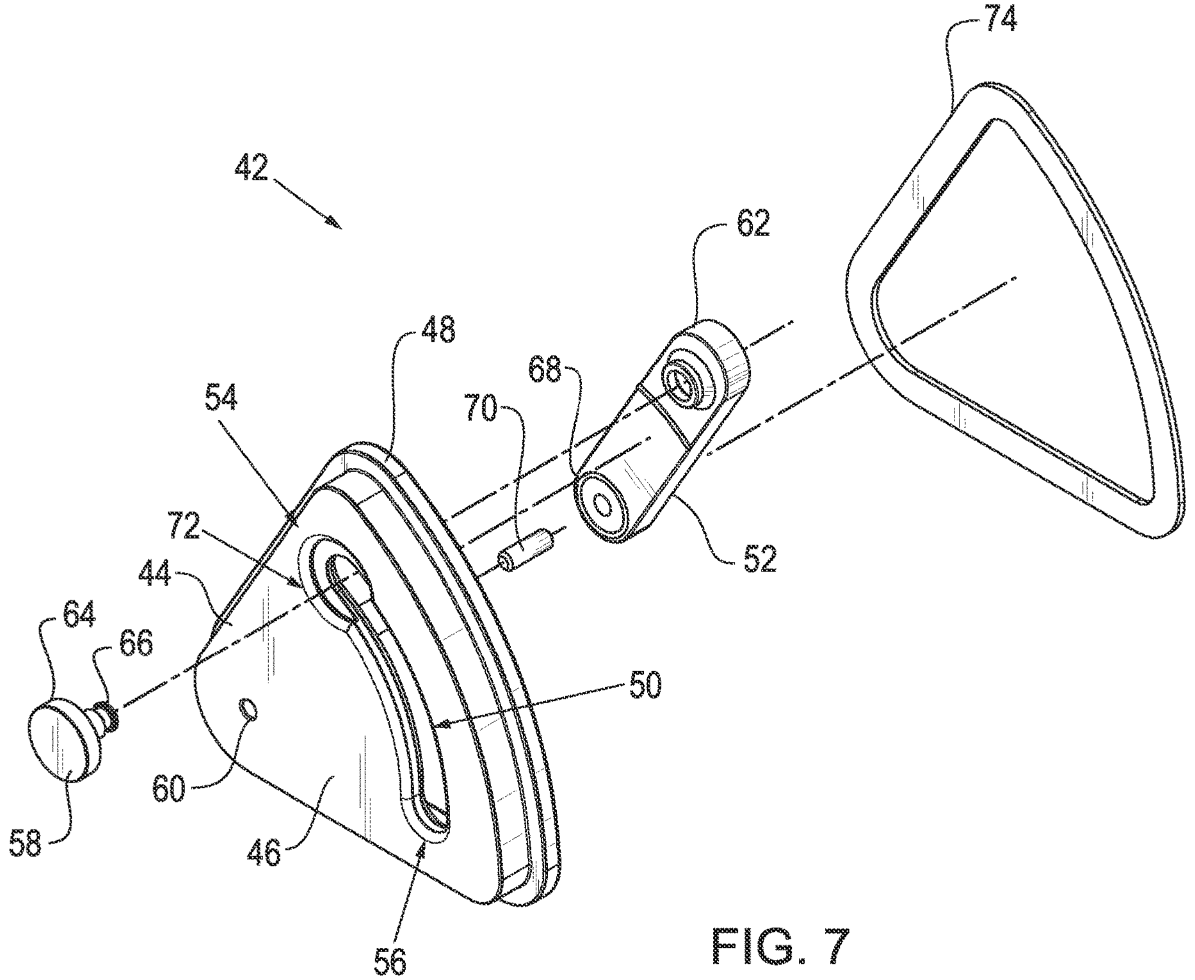
FIG. 7 is an exploded isometric view of the indicator system of FIGS. 4-6.
Figure 8:
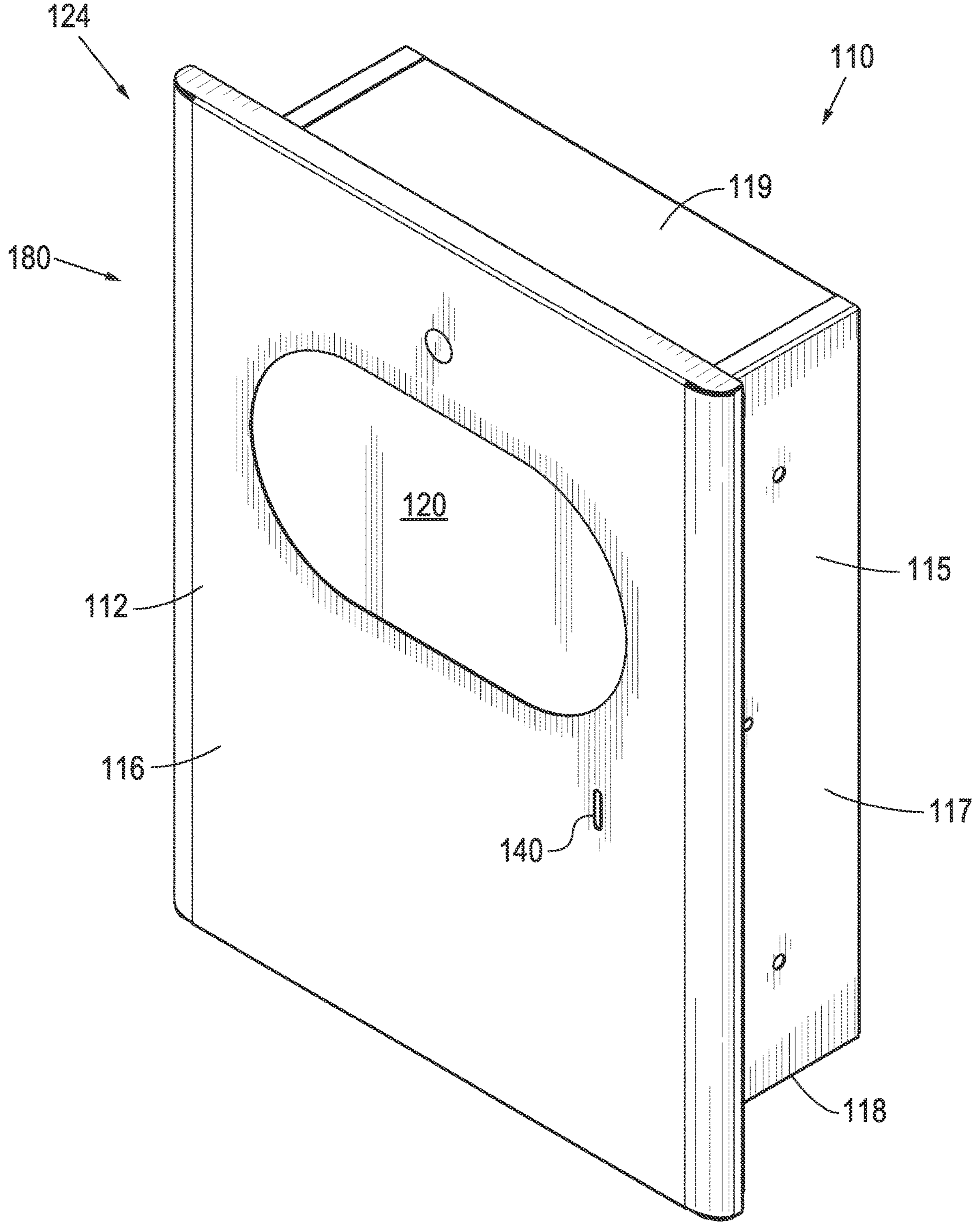
FIG. 8 is an isometric view of a disposal unit according to a second embodiment of the invention.
Figure 9:
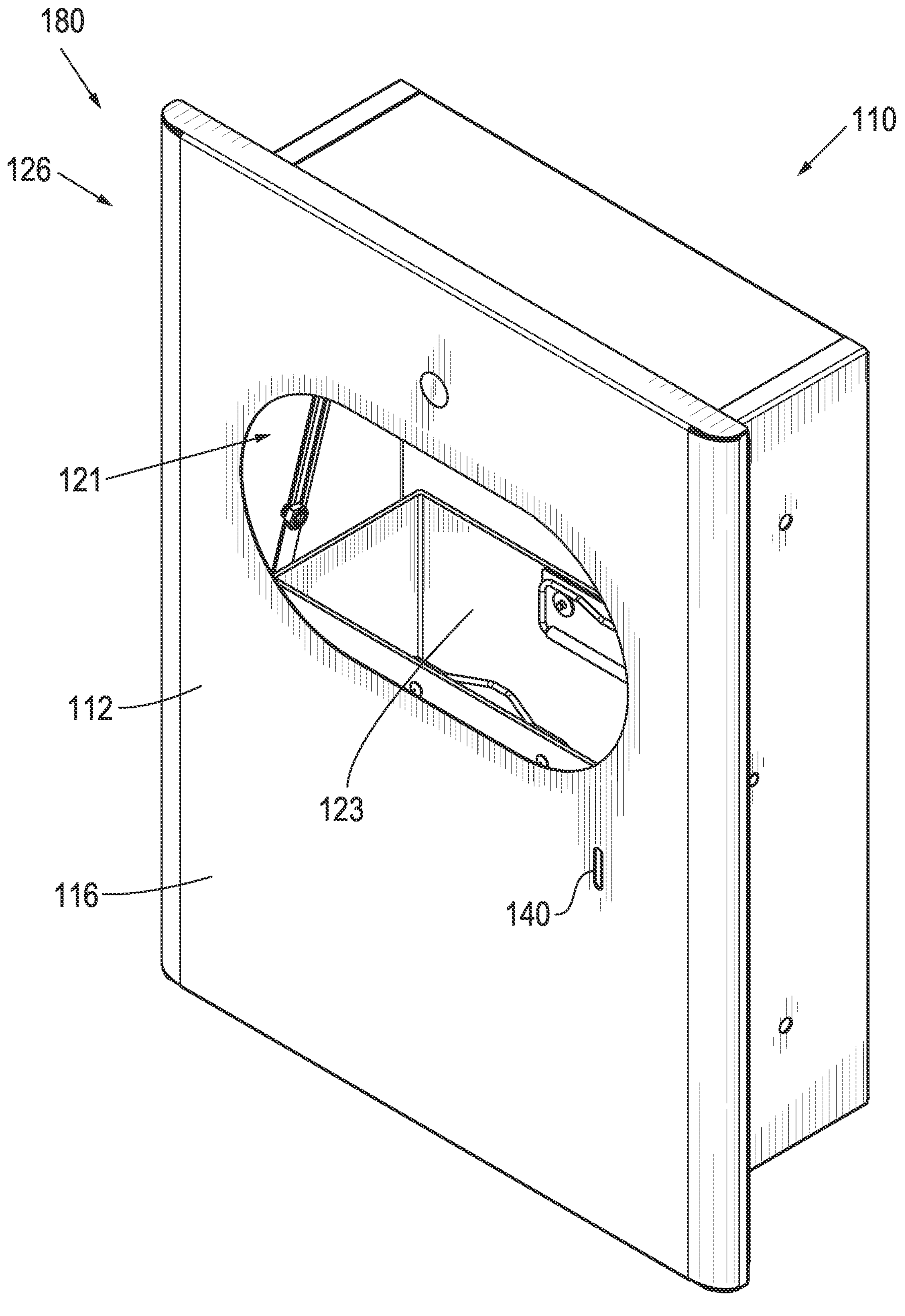
FIG. 9 is an isometric view of the disposal unit of FIG. 8 with the door in an open position.

As shown in the exploded isometric view of FIG. 7, additional components of the indicator system 42, which will be discussed in further detail below, are disposed in the cavity 49 and between the main surface 46 of the housing body 44 and the mounting surface 38 of the lid 20. Further yet, while the representative embodiment of the invention illustrates the sidewall 48 of the housing body 44 as having a contour and not being completely linear, varying embodiments of the invention may orient the sidewall 48 of the housing body 44 at varying angles and varying contours.

The main surface 46 includes a slot 50 formed therethrough that allows movement of an indicator arm 52 along the slot 50 from a first, starting point 54 to a second, ending point 56. In the representative embodiment of the invention, the slot 50 is in the form of an arc of travel of the indicator arm 52 as it pivots about a pivot point 60. It is contemplated that alternative arrangements of travel for the indicator arm 52 can result in different shapes of the slot 50.

The indicator arm 52 includes a locator 58 disposed at a second end 62 thereof. The locator 58 includes a tab portion 64 and a neck portion 66 extending from the tab portion 64. The neck portion 66 is configured to be coupled to the indicator arm 52 at the second end 62 thereof and extend through the slot 50. As a result, the tab portion 64 of the locator 58 is disposed on an opposite side of the main surface 46 from the indicator arm 52. Meanwhile, a second end 68 of the indicator arm 52 is pivotably coupled to the main surface 46 of the housing body 44 at the pivot point 60. As the indicator arm 52 pivots about the pivot point 60, the locator 58 travels along the slot 50 between the start point 54 and the end point 56.

In the representative embodiment of the invention, the indicator arm 52 is coupled to the pivot point 60 via a pivot pin 70. In other embodiments of the invention, the indicator arm 52 may be pivotably connected to the lid 20 (for example, to the mounting surface 38 of the lid) as an alternative to being pivotably mounted to the housing body 44.

Figure 6:
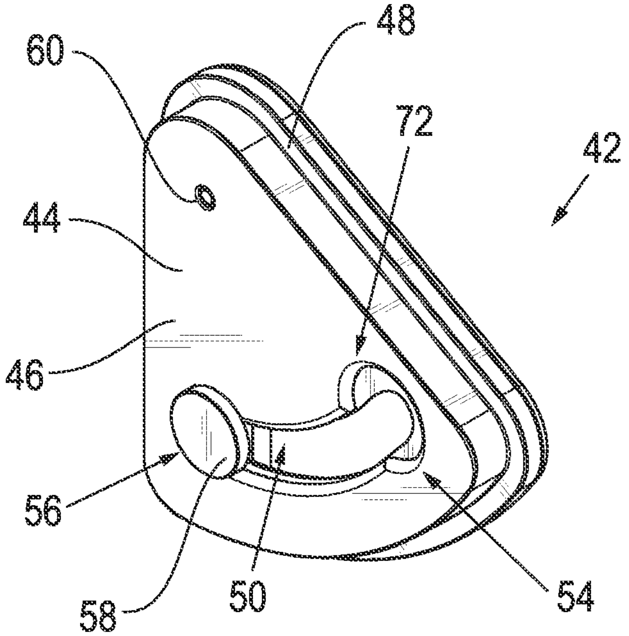
FIG. 6 is an isometric view of the indicator system of FIGS. 3 and 4 in the second orientation.

The start point 54 of the slot 50 includes a recess 72 formed therein. As shown in FIGS. 6 and 7, the recess 72 may be in the form of a countersink, counterbore, or the like in the main surface 46 of the housing body 44 on the side opposite the cavity 49 of the housing body 44. The recess 72 has a larger diameter than that of the slot 50 and is sized to receive the indicator 58 at the start point 54 of the slot 50.

As discussed above, the housing body 44 is mounted to the mounting surface 38 of the lid 20. As shown in FIG. 7, an mounting ring 74 following the edge of the sidewall 48 of the housing body 44 may be disposed between the housing body 44 and the mounting surface 38 to adhere the housing body 44 to the mounting surface 38. The mounting ring 74 may be in the form of an adhesive, tape, or other material used to couple the housing body 44 to the mounting surface 38. In other embodiments of the invention, the mounting ring 74 may partially follow the edge of the sidewall 48 or be located at multiple locations along the edge of the sidewall 48 to couple the housing body 44 to the mounting surface 38.

Alternatively, the housing body 44 may also include an additional mounting body 202 extending outward therefrom and contoured to fit against the sidewall 36 of the lid 20. to allow for improved installation of the indicator system 42 and its housing body 44 on the inside surface 38 of the lid 20. The surface of the additional mounting body 202 is preferably in line or closer to the inner surface 38 of the lid 20 than the surface 46 of the housing body 44. The additional mounting body 202 may further include an area designated for indicia 204 adjacent to the housing body 44 to assist in installation of the indicator system 42.

During use of the disposal unit 10, the indicator system 42 is configured to allow maintenance personnel to easily identify whether or not the disposal unit 10 needs to be emptied. The disposal unit 10 described above operates by transitioning the locator 58 from the start point 54 of the slot 50 to the end point 56 of the slot 50 in response to opening the lid 20 of the disposal unit 10. Further openings of the lid 20 will cause the locator 58 to remain at the end point 56 of the slot 50 until the locator 58 is reset at the start point 54 by maintenance personnel after emptying the disposal unit 10.

As stated above, the indicator arm 52 is configured to pivot about a pivot axis aligned with the pivot point 60. As shown in FIGS. 3 and 4, when the lid 20 is opened for a user to access the cavity 14 within the disposal unit 10 to throw away an article, the housing body 44 is oriented so that the vertical low point of the slot 50 is the end point 56 of the slot 50. As such, gravity causes the indicator arm 52 to pivot about the pivot axis so that the locator 58 travels from the start point 54 to the end point 56 when the lid 20 is open. Similarly, if the locator 58 and indicator arm 52 are at the end point 56, gravity will cause the locator 58 and the indicator arm 52 to remain at the end point 56.

As discussed above, the disposal unit 10 includes an indicator slot 40. In the representative embodiment of the invention shown in FIGS. 1-4, the indicator slot 40 is formed in the top plate 34 of the lid 20. The indicator slot 40 is so positioned that, when the locator 58 and the indicator arm 52 are at the end point 56 of the slot 50, the indicator arm 52 is also aligned with the indicator slot 40 to indicate to maintenance personnel that the locator 58 and the indicator arm 52 are at the end point 56 of the slot 50 and that a user has used the disposal unit 10. A rear surface of the indicator arm 52 that is visible through the indicator slot 40 may be colored to provide an enhanced indication to maintenance personnel.

Upon emptying of the disposal unit 10, maintenance personnel are able to reset the locator 58 and indicator arm 52 at the start point 54 of the slot 50. That is, maintenance personnel are able to move the locator 58 along the slot from the end point 56 to the start point 54. In turn, the indicator arm 52 is no longer aligned with the indicator slot 40, which notifies maintenance personnel that the disposal unit 10 has not been used.

Upon arrival at the start point 54, the locator 58 is able to be pressed into the recess 72, which is sized to a similar diameter as the locator 58 in order to hold the locator 58 in the recess 72 until closure of the lid 20. The locator 58 is configured to move perpendicular to the indicator arm 52 in order to be received into the recess 72.

Upon closure of the lid 20, gravity causes the locator 58 to move perpendicularly away from the indicator arm 52 and drops out of the recess. As a result, the locator 58 is now able to move along the slot 50 in response to opening of the lid 20.

Turning now to FIGS. 8-12, a disposal unit 110 is shown according to another embodiment of the invention. The disposal unit 110 includes a housing 112 surrounding a cavity 114 in which a user may disposed of a waste product. The disposal unit 110 may be free standing or mounted to a wall. In the representative embodiment of the invention, the housing 112 includes a front panel 116 pivotably coupled to a frame 115. The frame 115 is formed by a sidewalls 117, a bottom wall 118, and a top wall 119. Together the front panel 116 and the frame 115 surround a cavity 114. In varying embodiments of the invention, the frame 115 may be formed by any number of sidewalls, bottom walls, and top walls to surround the cavity 114 in conjunction with the front panel 116.

An opening 121 is formed in the front panel 116 and a door 120 is pivotably coupled to the front panel 116 at an edge of the opening 121. As a result, the door 120 covers the opening 121 in a closed position 125 (see FIG. 8), while allowing a user to access the cavity 114 through the opening 121 when the door 120 is in an open position 126 (see FIG. 9).

As stated above, the front panel 112 is pivotably coupled to the frame 115. As a result, the front panel 112 is able to transition between a closed orientation 180 (see FIGS. 8 and 9) and an open orientation 182 (see FIGS. 9 and 10). While the representative embodiment of the invention illustrates the use of a slide hinge 184 mounted to the frame 115 at a first end and the front panel 112 at second end, alternative hinges and pivoting mechanisms may be used to allow the front panel 112 to pivot away from the frame 115 in order to place the disposal unit 110 in the open orientation 182 and pivot the front panel 112 toward the frame 115 in order to place the disposal unit 110 in the closed orientation 180.

Figure 10:
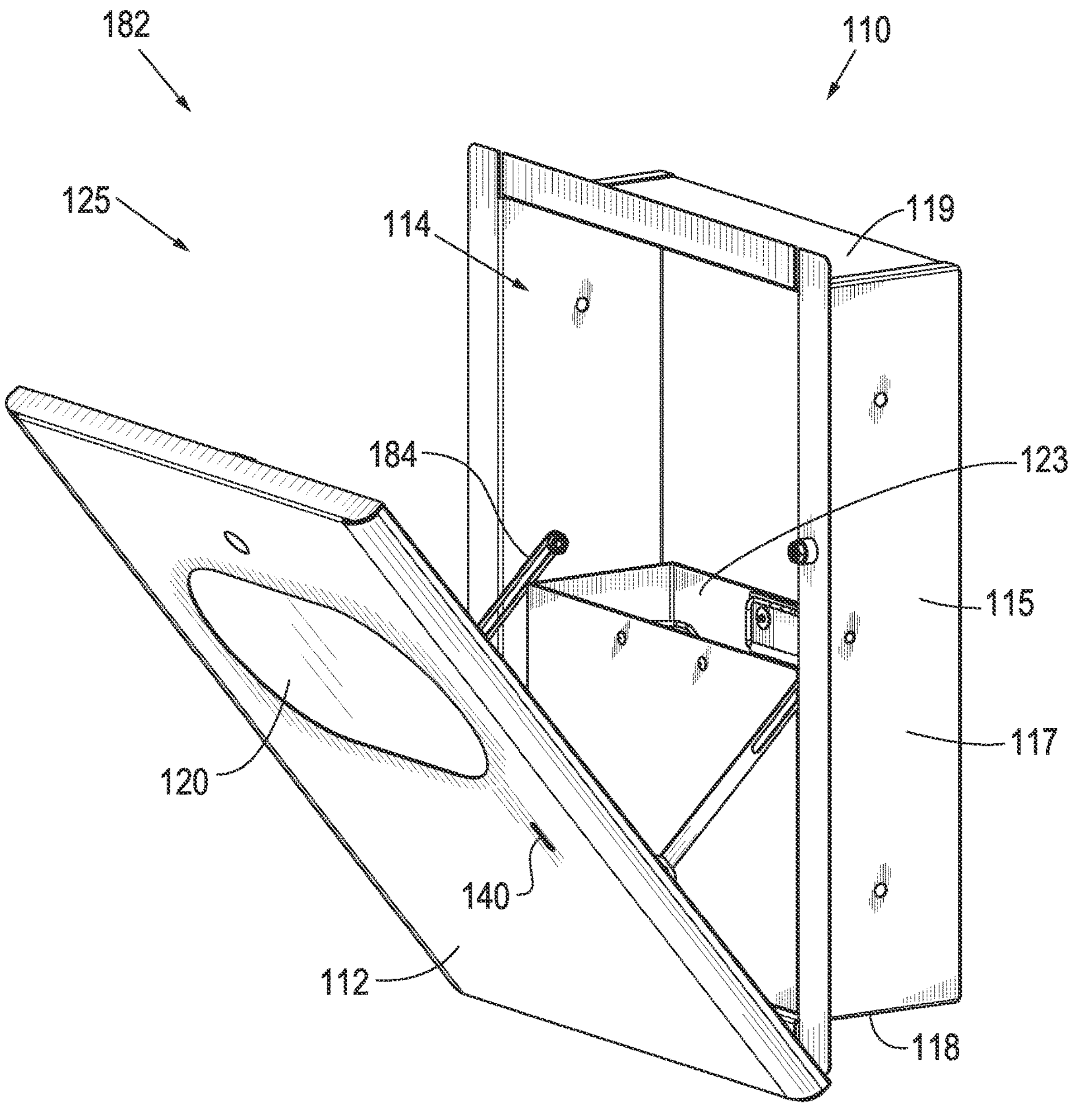
FIG. 10 is an isometric view of the disposal unit of FIG. 8 with the front panel in an open position.

As shown in FIG. 10, a waste unit 123 may be disposed in the cavity 114 of the housing 112 to hold a waste bag or the like within the cavity 114 to receive a waste product from the user.

Figure 11:
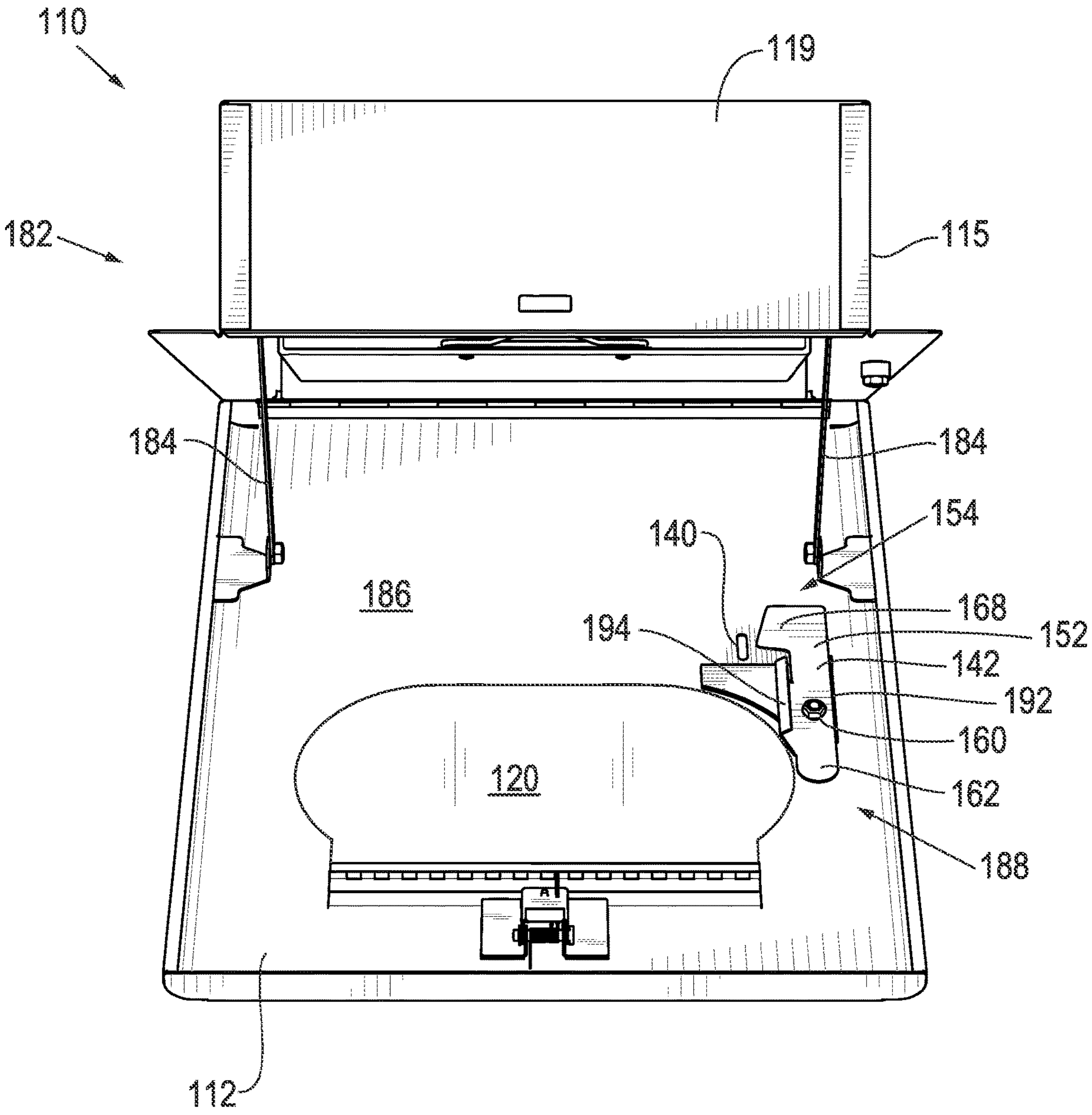
FIG. 11 is a rear interior view of the disposal unit of FIG. 8 with the indicator system in a first orientation.
Figure 12:
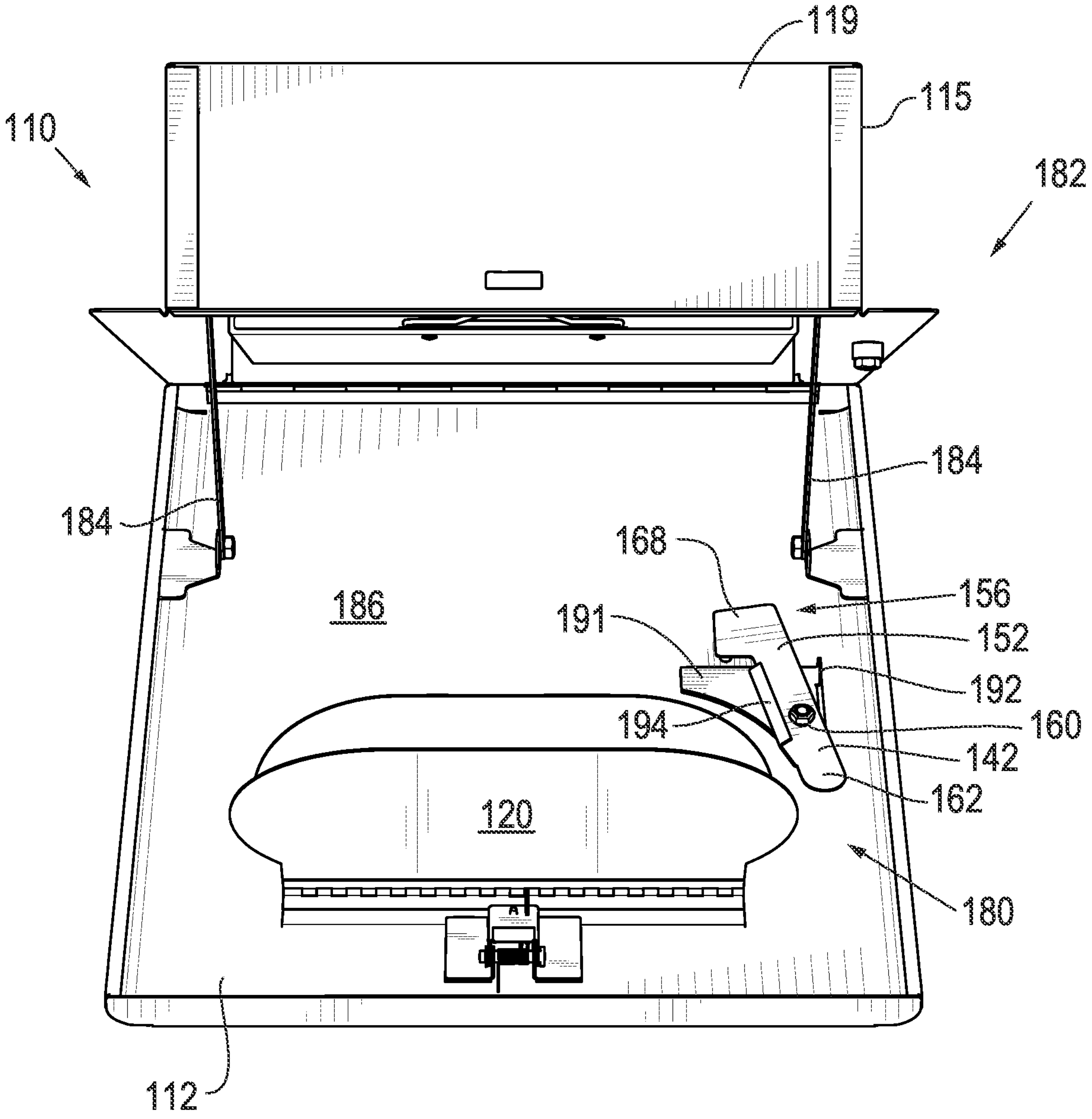
FIG. 12 is a rear interior view of the disposal unit of FIG. 8 with the indicator system in a second orientation.

Referring now to FIGS. 11 and 12, the disposal unit 110 is shown in the open orientation 182 and an interior surface 186 of the front panel 112 is shown. In this representative embodiment of the invention, an indicator system 142 is shown pivotably mounted to the interior surface 186 of the front panel 112 at a location adjacent the opening 121 and door 120 and about a pivot point 160. As described below, the indicator system 142 is aligned to interact with the door 120 of the disposal unit 110 and transition between a start orientation 188 and an end orientation 190.

The indicator system 142 includes an indicator arm 152 having a first end 162 and a second end 168. The pivot point 160 may be located at, adjacent to, or spaced apart from the first end 162 of the indicator arm 152 in varying embodiments of the invention. The second end 168 of the indicator arm 152 is shown as spaced apart from the pivot point 160 to allow for movement of the second end 168 between a start point 154 and an end point 156 as the indicator arm 152 transitions between the start orientation 188 and the end orientation 190.

In the start orientation 188, the second end 168 of the indicator arm 152 is disposed at the start point 154 shown in FIG. 11. At this location, the second end 168 of the indicator arm 152 is not aligned with an indicator slot 140 formed in the front panel 112.

Meanwhile, in the end orientation 190, the second end 168 of the indicator arm 152 is disposed at the end point 156 shown in FIG. 12. At this location, the second end 168 of the indicator arm 152 is aligned with an indicator slot 140 formed in the front panel 112 to indicate to maintenance personnel that a user has used the disposal unit 110. A rear surface of the indicator arm 152 that is visible through the indicator slot 140 may be colored to provide an enhanced indication to maintenance personnel.

During use of the disposal unit 110, a user is able to push open the door 120 of the disposal unit 110. In turn, the door 120 pushes on an extension tab 194 of the indicator arm 152 to transition the indicator arm 152 from the start orientation 188 to the end orientation 190. As a result, the second end 168 of the indicator arm 152 transitions from the start point 154 to the end point 156 and becomes aligned with the indicator slot 140. As shown in FIGS. 11 and 12, the extension tab 194 extends from a side surface of the indicator arm 152 and toward the door 120 and provides a surface that interacts with the door 120 when the indicator arm 152 is in the start orientation 188. Once the indicator arm 152 is in the end orientation 190, the extension tab 194 is pushed away from the door 120 to a location that no longer interacts with the door 120. As a result, once the indicator arm 152 is in the end orientation 190, it is maintained in this position no matter how many times the door 120 is pushed open by a user.

In the representative embodiment of the invention, the extension tab 194 may be integrally formed with the indicator arm 152. In other embodiments, the extension tab 194 may be coupled to a side surface of the indicator arm 152.

To empty the disposal unit 110, maintenance personnel transition the front panel 112 from the closed orientation 180 to the open orientation 182 to access the waste unit 123 within the housing 112. When the front panel 112 transitions from the closed orientation 180 to the open orientation 182, gravity causes the indicator arm 152 to pivot about the pivot point 160 from the end orientation 190 to the start orientation 188. In turn, the second end 168 of the indicator arm 152 transitions from the end point 156 to the start point 154 and is no longer aligned with the indicator slot 140. When the maintenance personnel closes the disposal unit 110, the indicator arm 152 remains in the start orientation 188 until a user pushes the door 120 to interact with the extension tab 194 of the indicator arm 152.

The indicator system 142 also includes a stop element 191 that is raised from the inner surface 186 of the front panel 112 and configured to stop the indicator arm 152 at the start orientation 188 when transitioning from the end orientation 190 to the start orientation 188. The stop element 191 may be mounted to the interior surface 186 of the front panel 112 and include a stop tab 192 extending upward from the front panel 112. The stop tab 192 provides a stopping surface that interacts with a side surface of the indicator arm 152 to stop the indicator arm 152 in the start orientation 188.

Although the best mode contemplated by the inventors of carrying out the present invention is disclosed above, practice of the present invention is not limited thereto. It will be manifest that the various additions, modifications, and rearrangements of the features of the present invention may be made without deviating from the spirit and scope of the underlying inventive concept.

Moreover, the individual components need not be formed in the disclosed shapes, or assembled in the disclosed configuration, but could be provided in virtually any shape, and assembled in virtually any configuration. Furthermore, all the disclosed features of each disclosed embodiment can be combined with, or substituted for, the disclosed features of every other disclosed embodiment except where such features are mutually exclusive.

It is intended that the appended claims cover all such additions, modifications and rearrangements. Expedient embodiments of the present invention are differentiated by the appended claims.

We claim:

1. A disposal unit comprising:

a housing surrounding a cavity;

an indication slot formed in the housing;

an indicator system mounted within the housing and including an indicator arm movable between a start point not aligned with the indication slot and an end point aligned with the indication slot;

when the indicator arm is in the start position, the indicator arm is configured to transition from the start point to the end point upon opening of a door of the housing; and when the indicator arm is in the end position, the indicator arm is configured to remain in the end point upon opening of the door of the housing.

2. The disposal unit of claim 1, further comprising, when the indicator arm is at the end point, the indicator arm being transitionable from the end point to the start point by a user upon accessing the cavity of the housing.

3. The disposal unit of claim 1, wherein the indicator system further comprises an indicator housing mounted to the door of the disposal unit, the housing body including a main surface spaced apart from the door by a plurality of sidewalls to form an indicator cavity therebetween;

the main surface of the indicator housing having a slot formed therein;

the indicator arm being pivotably mounted within the indicator cavity and having a first end and a second end, the second end configured to travel along the slot between the start point and the end point.

4. The disposal unit of claim 3, wherein the slot includes a recess formed at least partially therethrough at the start point thereof, the recess having a diameter larger than a diameter of the slot and configured to receive a locator tab of the indicator arm.

5. The disposal unit of claim 4, wherein the locator tab is movably coupled to the second end of the indicator arm so as to be configured to sit within the recess when the door of the disposal unit is open and space itself apart from the recess when the door of the disposal unit is closed while the indicator arm remains at the start point.

6. The disposal unit of claim 1, further comprising, when the indicator arm is at the end point, the indicator arm transitions from the end point to the start point upon pivoting a front panel of the housing to access the cavity of the housing.

7. The disposal unit of claim 6, further comprising an extension tab extending from a side of the indicator arm, the extension tab configured to interact with the door of the disposal unit in order to transition the indicator arm from the start point to the end point upon opening of the door of the disposal unit.

8. A disposal unit comprising:

a housing body having a main surface and a sidewall extending from one or more edges of the main surface toward a mounting surface of the disposal unit, the main surface being spaced apart from the mounting surface of the disposal unit to form a cavity therebetween;

an indicator arm having a first end and a second end, the first end of the indicator arm being pivotably mounted to at least one of the housing body and the mounting surface, the second end of the indicator arm configured to travel along a slot formed in the main surface of the housing body;

a locator movably coupled to the second end of the indicator arm, the locator having a tab portion and neck portion, the neck portion being disposed within a slot opening;

the slot opening formed in the main surface extending from a start point to an end point; and a recess at the start point of the slot opening and having a diameter larger than a diameter of the slot opening, the recess configured to receive the tab portion of the locator.

9. The disposal unit of claim 8, wherein the locator is movably coupled in a direction normal to the second end.

10. The disposal unit of claim 8, wherein the locator is configured to transition away from the indicator arm in the direction normal upon closing of a lid of the disposal unit.

11. The disposal unit of claim 10, wherein the locator is configured to transition toward the indicator arm in the direction normal by a user to secure the locator in the recess while the lid of the disposal unit is open.

12. The disposal unit of claim 8, wherein the indicator arm is configured to transition or remain in the end point of the slot upon opening of a lid of the disposal unit.

13. The disposal unit of claim 8, further comprising a secondary surface of the housing body disposed at an end of the sidewall opposite the main surface of the housing body, the secondary surface extending perpendicular to the sidewall.

14. The disposal unit of claim 13, wherein the secondary surface is coupled to the mounting surface.

15. A disposal unit comprising:

a housing surrounding a cavity and including a door;

an indicator arm pivotably mounted to the disposal unit to transition from a start point to an end point;

an indication surface of the indicator arm configured to align with an indicator slot in the disposal unit when in at the end point;

upon opening of the disposal unit by a user, the indicator arm transitions or remains in the start point; and upon pushing a door of the disposal unit, the door interacts with the indicator arm to transition or remain in the end point.

16. The indicator system of claim 15, wherein the indicator arm is pivotably mounted to a front panel of the housing.

17. The indicator system of claim 16, wherein the disposal unit is opened by a user by pivoting the front panel of the housing from a closed orientation to an open orientation.

18. The indicator system of claim 15, further comprising an extension tab extending from a side of the indicator arm at an angle relative thereto.

19. The indicator system of claim 18, wherein the extension tab extends from the indicator arm in a direction toward the door so that pushing the door causes the door to interact with the extension tab to transition the indicator arm to the end point.

20. The indicator system of claim 15, further comprising a stop element disposed within the housing, the stop element including a stop tab configured to locate the indicator arm in the start point.

* * * * *